(12) United States Patent
Jungerman et al.

(10) Patent No.: US 6,898,000 B2
(45) Date of Patent: May 24, 2005

(54) POLARIZATION-INDEPENDENT OPTICAL SAMPLING WITH EXTENDED WAVELENGTH RANGE

(75) Inventors: Roger L. Jungerman, Petaluma, CA (US); Randall King, Santa Rosa, CA (US); Gregory Steven Lee, Mountain View, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 657 days.

(21) Appl. No.: 09/935,824

(22) Filed: Aug. 22, 2001

(65) Prior Publication Data

US 2003/0038936 A1 Feb. 27, 2003

(51) Int. Cl.[7] ............................. G02F 1/37; G02B 27/28
(52) U.S. Cl. ........................................ 359/328; 359/495
(58) Field of Search ................................ 359/326–332, 359/494–497; 385/11, 122; 356/364–368

(56) References Cited

U.S. PATENT DOCUMENTS 6,661,577 B1 * 12/2003 Wu et al. .................... 359/619
6,744,508 B2 *  6/2004 Jungerman et al. ......... 356/364

* cited by examiner

Primary Examiner—John D. Lee

(57) ABSTRACT

A nonpolarization-dependent method and apparatus for optical sampling of a user optical signal of a known frequency range (e.g., corresponding to 1550 nm wavelength) uses a probe signal in an unsplit form and applies a conversion {e.g., by sum frequency generation (SFG)} operation in a first stage to the probe signal and to a first polarization component of the user optical signal (e.g., 's' component) to produce a first component of an output signal. In a second stage, a second polarization component of the user optical signal (e.g., 'p' component) is rotated by 90° to align with the first polarization component and then converted by mixing with the unsplit probe signal to produce a second component of an output signal. The first and second output component signals are both added and measured using a photomultiplier tube (PMT) or an avalanche diode.

32 Claims, 5 Drawing Sheets

POLARIZATION-INDEPENDENT OPTICAL SAMPLING WITH EXTENDED WAVELENGTH RANGE

BACKGROUND OF THE INVENTION

1. Technical Field of the Invention

This invention generally relates to optical sampling, and more particularly to polarization-independent optical sampling with extended wavelength range.

2. Description of Related Art

Optoelectronics technology and its applications are expanding with the result that integrated optics technology can be used with considerable advantages in communications. Optical modulators, switches, multiplexers are commonly employed by fabricating them both on single substrates of both dielectrics and semiconductors. For measuring the waveforms of optical pulses used in high bit rate optical communications, it is common practice and desirable to use optical sampling with high sensitivity and high time resolution. Optical sampling systems often use a probe pulse signal and optical mixing with a user signal to achieve what is known as sum frequency generation (SFG) which is very useful for obtaining representations of sampled user signals. Some SFG methods of optical sampling might result in undesirably high background noise. Higher pump powers for optical sampling systems are desirable, but result in a greater need to eliminate background noise, because background noise increases with the square of the probe intensity. Also high powered probe signals are relatively more expensive.

It is to be noted that sum frequency generation (SFG) processes may use a nonlinear crystal such as for example, a periodically poled lithium niobate (PPLN) crystal. The use of a PPLN crystal in optical sampling systems is taught for example in the publication "Highly Sensitive and Time-Resolving Optical Sampling System Using thin PPLN Crystal" by S. Nogiwa, et al., Electron Lett, Vol 36, IEE 2000, which is incorporated herein by reference. PPLN crystals as opposed to other nonlinear crystals, e.g., KTP (potassium titanyl phosphate), have a large sum frequency generation efficiency under quasi-phase matching conditions. By a judicious selection of the PPLN crystal thickness, a reduction of the time resolution of the system to less than 1 ps and an increase of the wavelength sensitivity band width can be achieved. Experience has shown that the crystal length also partly influences performance characteristics such as acceptance and efficiency, both of which are inversely proportional to the crystal length.

Optical probe pulse sources are commercially available with a variety of features and applications with wavelength capabilities of 1550–1650 nm and some with 1100–1650 nm. Other wavelength capabilities for commercially available optical probe pulse sources are also known. Because of the availability of optical amplifiers in the 1550 nm wavelength band, there are several technologies available for obtaining short optical sampling pulses near 1550 nm. Examples of such include gain-switched semiconductor lasers and Erbium-Doped Ring Lasers.

High-speed sampling of optical signals facilitates reliable oscilloscope measurements of sampled signals. It has been found that a narrow sampling aperture enables achieving higher bandwidths than with regular electrical sampling techniques. Commercial optical sampling short-pulse sources near the 1550 nm range may indeed be obtained for this purpose. However, in most instances the input signals to be sampled also fall in the same 1550 nm wavelength band, which makes it difficult to distinguish the input signals from the probe or sampling pulse signals, compounding the background noise problem and, complicating the measurement system design.

In the optical signal sampling technology, it is to be noted that invariably the sampling signal or the probe signal is chosen to be much stronger than the user input signal, so as to obtain efficient conversion. For example, the user input signal could be of a magnitude of 1 milliwatt, whereas the probe or sample pulse may be 1 kilowatt peak.

The usual method of performing nonlinear conversion, as known, is by using a crystal that is designed to have a high conversion efficiency. Conversion efficiency of a crystal is influenced not only by the crystal length as discussed supra, but also by how precisely the conversion crystal axis is aligned with the polarization of the sampling pulse and user input signal. The sampling pulse or the probe signal is typically linearly polarized and generally does not pose any alignment issues. The user input signal on the other hand consists of two polarization components, one of which is not aligned with the crystal, resulting in a low output signal because of the polarization dependence.

Experimental attempts have been made to address the above described polarization dependence problem by using a manual polarization controller in front of the user input. The use of a manual polarization controller, however, is not practical in a commercial instrument or in a non-experimental situation.

In certain polarization deversity receivers on the other hand, the user input signal is split two polarized components, and the outputs are detected separately. The gain in each component route can be adjusted to compensate for polarization dependent loss (PDL).

One method of optical sampling without splitting either the sampling pulse or the user input signal wherein wider spectral acceptance is obtained using a shorter crystal and a three wavelength conversion scheme is described in co-pending U.S. application Ser. No. 09/885,154, which was filed on Jun. 20, 2001, and is now issued as U.S. Pat. No. 6,785,471, entitled "Optical Sampling Using Intermediate Second harmonic Frequency Generation", which is incorporated herein by reference. It is noted in this context that just as stated in the co-pending U.S. Application, commercially available probe pulse sources usually are in the 1550–1560 nm range whereas user input signals in optical communications are in the 1550 nm range. In the co-pending U.S. Application however, efficiency of conversion of the optical input signal for sampling is somewhat sacrificed.

There is a need for a polarization-independent method and apparatus for optical sampling of a user input signal using a probe signal without sacrificing conversion efficiency and without a high degree of alignment problems. The need is especially felt when a user input signal comes from an optical fiber wherein the polarization state of the input signal is not known.

SUMMARY OF THE INVENTION

The present invention offers apparatus and method for optical sampling of an input signal by mixing an unsplit probe pulse signal separately with 'p' and 's' optical signal components, to obtain two output signals which are combined to provide an optical sample. In some known optical sampling methods which use SFG for sampling, only a single signal component ("p" or "s") is harnessed to produce an output signal since a second signal component is not aligned with the crystal used for the SFG process. The present invention uses a method which changes the alignment of the second signal component so that the output signal during sampling can practically be doubled, by combining the signal outputs from using both the 'p' and 's' signal components. Also, by the use of both the 'p' and 's' signal components, it is possible, without sacrificing the output signal strength, to use a probe pulse source which has about half the power which might be needed in the event only one of the two signal components 'p' and 's' were sampled. Lower powered probe pulse sources are relatively inexpensive, and thus the inventive optical sampling method and apparatus using a lower power probe pulse source are economical.

It is conceivable that optical sampling can be done by splitting a sampling pulse to align separately with two polarization components of the user input signal. The approach of splitting the sampling pulse, however, gives rise to the following two considerations:

(1) The nonlinear conversion efficiency is critically dependent on the total and peak powers in the sampling pulse. Splitting the sampling pulse or probe signal reduces the intensity in half; and (2) If the sampling pulse is very narrow (perhaps a few hundred femtoseconds long), precisely aligning the lengths of the two parallel polarization conversion paths is difficult. Incorrect alignment will result in polarization dependent delay in the sampling measurement.

Also, an arrangement with split probe signal somewhat decreases conversion efficiency because the peak signal power of the sampling pulse is reduced. Further, splitting the probe signal requires two crystals to be used in parallel for the two sampling signal pulse components. When two crystals are used in parallel, both the crystals must have with the same physical orientation or else alignment and other practical difficulties are created. The present invention in one form obviates the disadvantages of splitting the probe signal.

An embodiment of the invention provides a sampling method for sampling an optical signal that uses a polarization-independent measuring scheme. A simple form of the polarization-independent scheme uses a cascaded nonlinear conversion crystal arrangement using two conversion stages in series for performing sum frequency generation. One of the conversion stages is for the conversion of the 's polarization' component, and the second conversion stage is for the conversion of the 'p polarization' component, both stages using a common relatively low powered probe pulse signal which is unsplit.

A modified sampling method in accordance with an embodiment of the invention uses a "two-pass" arrangement using a single nonlinear conversion crystal for sum frequency generation twice, using a forward pass for converting one polarized component of the user's input signal, and a reverse pass for converting a second polarized component of the user's input signal. Thus, optical sampling using the combined output of the sum frequency generation in both the above stated arrangements is polarization-independent.

An embodiment described hereinafter consists in a polarization-independent method of optical sampling of an optical input signal of a known fundamental frequency from a user in optical communications, comprising the steps of: using a probe pulse source of a predetermined wavelength range and frequency-doubling signals from the probe pulse source to obtain an intermediate output containing a frequency-doubled second harmonic probe pulse signal; processing the user's optical input signal by using both polarized input signal components 'p' and 's'; the step of processing including: causing a sum frequency generation (SFG)/operation to combine the two polarized input signal components in first and second stages separately with the frequency-doubled second harmonic probe pulse signal; the first stage converting one of the two polarized input signal components by SFG to produce a first component of a near third harmonic signal, diverting the first component of the near-third harmonic signal into an optical measuring element; the second stage converting the other of the two polarized input signal components by SFG to produce a second component of a near-third harmonic signal, the near-third harmonic signal being nearly thrice in frequency in relation to the known fundamental frequency; and directing the second component of the near-third harmonic signal also into the optical measuring element.

The need to perform frequency doubling of the probe pulse signal may be avoided if a probe pulse source of a desired frequency is procured for use. As an example, to sample an optical input signal of 1550 nm wavelength, a probe pulse source of approximately 1560 nm may be used and frequency-doubled to obtain a probe pulse source of 780 nm. Alternatively, a probe pulse source of 780 nm per se may be used without the need for frequency doubling.

In a modification of an embodiment of the invention, a double pass approach may be used by employing a single nonlinear wave converter wherein the SFG operation consists in using a first stage to generate the first component of said near third harmonic signal, and a second stage nonlinear conversion in a reverse pass for converting 'p' polarized input signal component to generate the second component of the near-third harmonic signal.

In another embodiment, the SFG operation consists in using periodically poled lithium niobate (PPLN) crystals for the first and second stage nonlinear conversion.

The optical measuring element in the invention may comprise a photomultiplier tube or an avalanche diode.

As illustrated, an embodiment of the invention includes the step of using an optical filter after frequency-doubling, to arrest any unconverted probe pulse source frequency.

Advantageously, after the step of SFG, the method may include the step of using a blocking filter for preventing signal components of frequency other than the near-third harmonic from reaching the optical measuring element.

An embodiment of the invention also resides in apparatus for polarization-independent optical-sampling of an optical input signal, using sum frequency generation on an unsplit probe signal and two polarized input signal components, the first component being used to generate a first near-third harmonic signal. The second polarized input signal component is rotated to be in phase with the first signal component, and used to generate a second near-third harmonic signal. The two near-third harmonic signals are added to obtain the optical sampling signal and can be obtained in two passes, either using two SFG stages, or a single SFG stage twice. In some earlier methods, only one component of the near-third harmonic was used, either requiring an expensive powerful probe pulse source to maintain the output signal strength, or, if a less powered probe pulse source was used, resulting in an insufficient output signal strength of the sample.

BRIEF DESCRIPTION OF THE DRAWINGS

A more detailed understanding of the invention can be had from the following description of preferred embodiments, given by way of example and to be understood in conjunction with the accompanying drawing wherein.

DETAILED DESCRIPTION OF PREFERRED EMBODIMENTS

Figure 1:
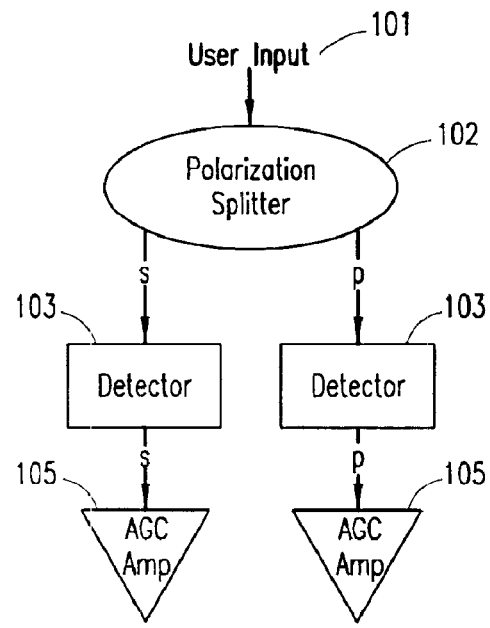
FIG. 1 shows a prior art arrangement where a user input signal is split into two polarized components that are sampled and measured independently.

FIG. 1 shows a prior art arrangement where a user input signal 101 is admitted into a polarization splitter 102 that produces two polarized components 's' and 'p'. The 's' and 'p' components are both shown by the reference numeral 103. The two polarized 'p' and 's' components are detected separately by independent detectors 103 and optionally amplified by using amplifiers AGC amp that are shown at 105.

Figure 2:
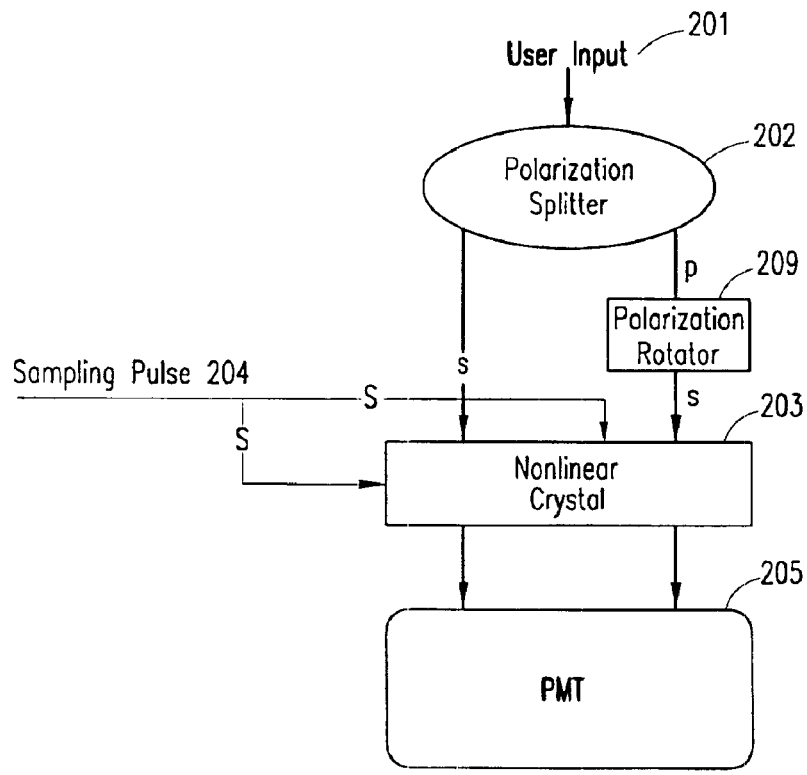
FIG. 2 shows a second prior art arrangement where the sampling pulse as well as a user input signal are split into two components each and passed through a nonlinear wave conversion crystal.

FIG. 2 shows a prior art arrangement wherein the sampling pulse, as well as the user input signal, are split into two components. Each of the two components is passed through a nonlinear wave conversion crystal 203. The user input signal is shown at 201 as passing through a polarization splitter, shown at 202. If the sampling pulse 204 has a predetermined polarity, say 's' for example, and if the polarized components for user input signal are both desirably in the 's' category, then sum frequency generation in nonlinear crystal 203 can be performed effectively. The output from the nonlinear crystal 203 is processed at an optical measuring unit, such as, for example, a photomultiplier tube PMT illustrated at 205. Even though the foregoing arrangement is functionally able to perform optical sampling with a fair degree of satisfaction, it should be noted that splitting the user input signal and the probe signal reduces the efficiency of SFG conversion for converting the user input signal into a near-third harmonic signal. Splitting the probe signal in this prior art arrangement, as stated supra, decreases conversion efficiency, causing undesirable consequences.

Figure 3:
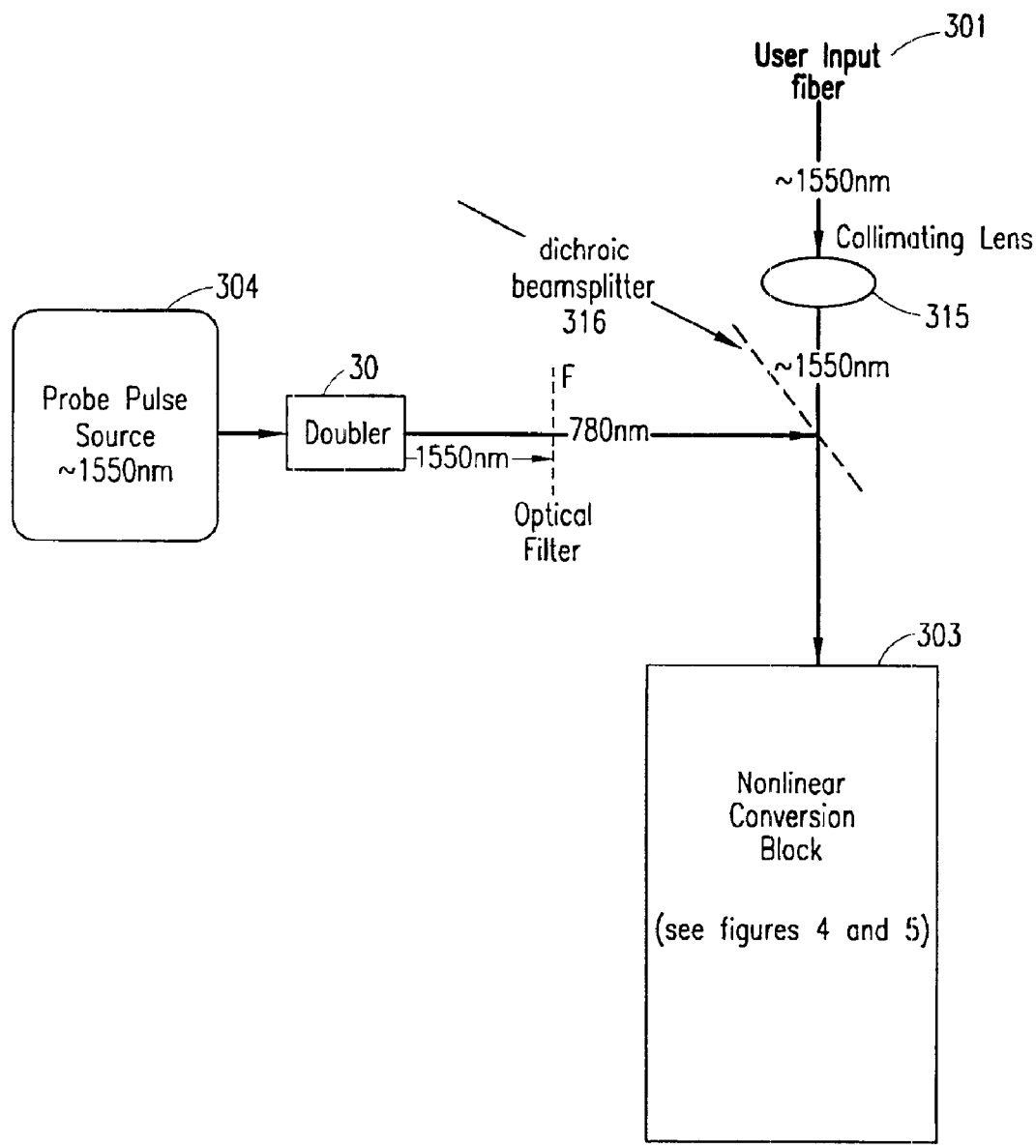
FIG. 3 illustrates an arrangement where an embodiment of the present invention can be utilized using polarization independence.

FIG. 3 illustrates an arrangement wherein an embodiment of the present invention can be utilized using polarization-independence. A user input optical signal is admitted into the optical sampling apparatus preferably through a user input fiber 301. The user input optical signal becomes incident on an optional collimating lens 315. The sampling signal is preferably obtained from a probe pulse source that advantageously produces a wave signal of 1550 nm wavelength, the probe pulse source being illustrated at 304. The 1550 nm probe pulse source signal is frequency-doubled by passing through doubler 30 to produce a signal that is predominately a second harmonic of the probe pulse signal and that also contains some unconverted 1550 nm component. The frequency-doubled signal is then passed through an optical filter illustrated as F where any unconverted 1550 nm component is arrested, and where the 780 nm component is allowed to pass through to be processed further. The second harmonic signal at 780 nm is mixed with polarized components of the user input signal 301 for sum frequency generation in nonlinear conversion block 303. The details of the nonlinear conversion block 303 can be more easily understood with reference to FIG. 4.

Figure 4:
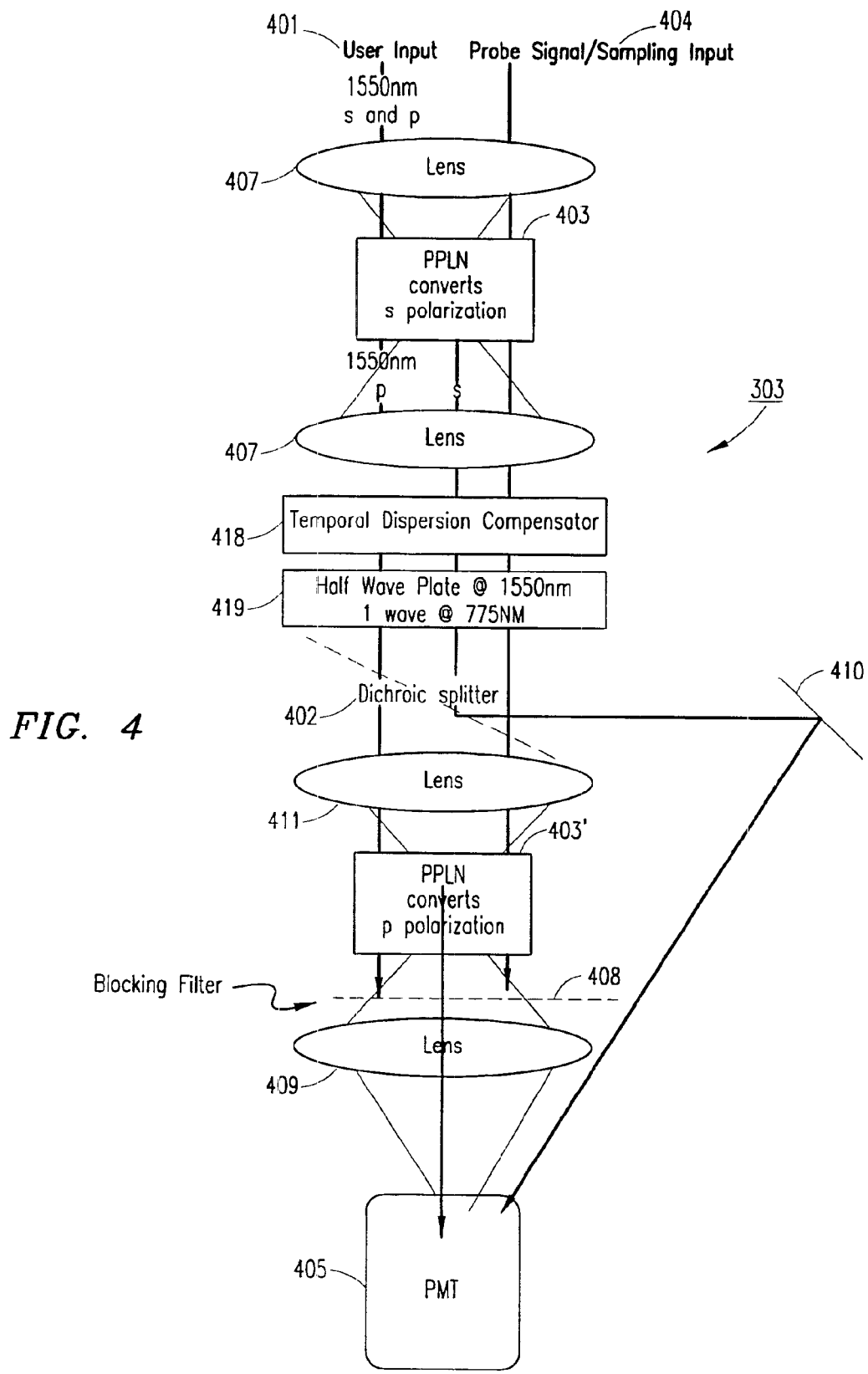
FIG. 4 illustrates a preferred nonlinear conversion block that is incorporated in FIG. 3.

FIG. 4 illustrates an exemplary nonlinear conversion block that is incorporated into FIG. 3. The user input signal that preferably is at 1550 nm and is shown at 401 has polarized components 's' and 'p' that become incident on a optional lens 407 along with a second harmonic probe signal shown at 404. The two polarized components of the user input signal 's' and 'p' emerge from the lens 407 along with the second harmonic probe signal and enter the first nonlinear conversion crystal illustrated at 403. The nonlinear conversion crystal 403 is preferably a periodically poled lithium crystal that is known as a PPLN crystal. Therein, the first polarized user input signal component, namely the 's' component, is converted using a sum frequency generation process along with the second harmonic probe signal to produce a signal that contains predominately a near-third harmonic. The signal that comes out of the PPLN 403 is sent to an optional temporal dispersion compensator 418 and a ½ waveplate 419. The ½ waveplate, illustrated at 419 rotates the nonconverted component of the user input signal by 90° and the second harmonic by a complete 180°. The signal that comes out of the ½ waveplate 419 is made to pass through a splitter shown at 402 which diverts the near-third harmonic component that was produced at the first sum frequency generation operation performed at the PPLN 403. The first near-third harmonic signal that is diverted by the splitter 402 is reflected expediently by a mirror 410 to become incident on an optical measuring unit, such as a photomultiplier tube illustrated as PMT and shown at reference 405. The component of the user input signal that has been rotated by 90° is mixed further with a component of the second harmonic sampling signal and allowed to pass through an optional lens 411 and made to become incident on a second nonlinear conversion crystal illustrated at 403'. The second nonlinear conversion crystal 403' is also preferably a PPLN that converts the 'p' polarization into a signal that comprises predominately a near-third harmonic contained in a signal that comes out of the PPLN crystal 403'. The signal that comes out of the PPLN crystal 403' is passed through an optional blocking filter. The blocking filter lets through the near-third harmonic signal that passes through an optional lens 409 to reach the photomultiplier tube 405. The two components of the user input signal, namely 's' and 'p', are thus both converted by mingling with a second harmonic sampling signal to produce first and second components of a near-third harmonic output which components are measured at the photomultiplier tube 405.

Figure 5:
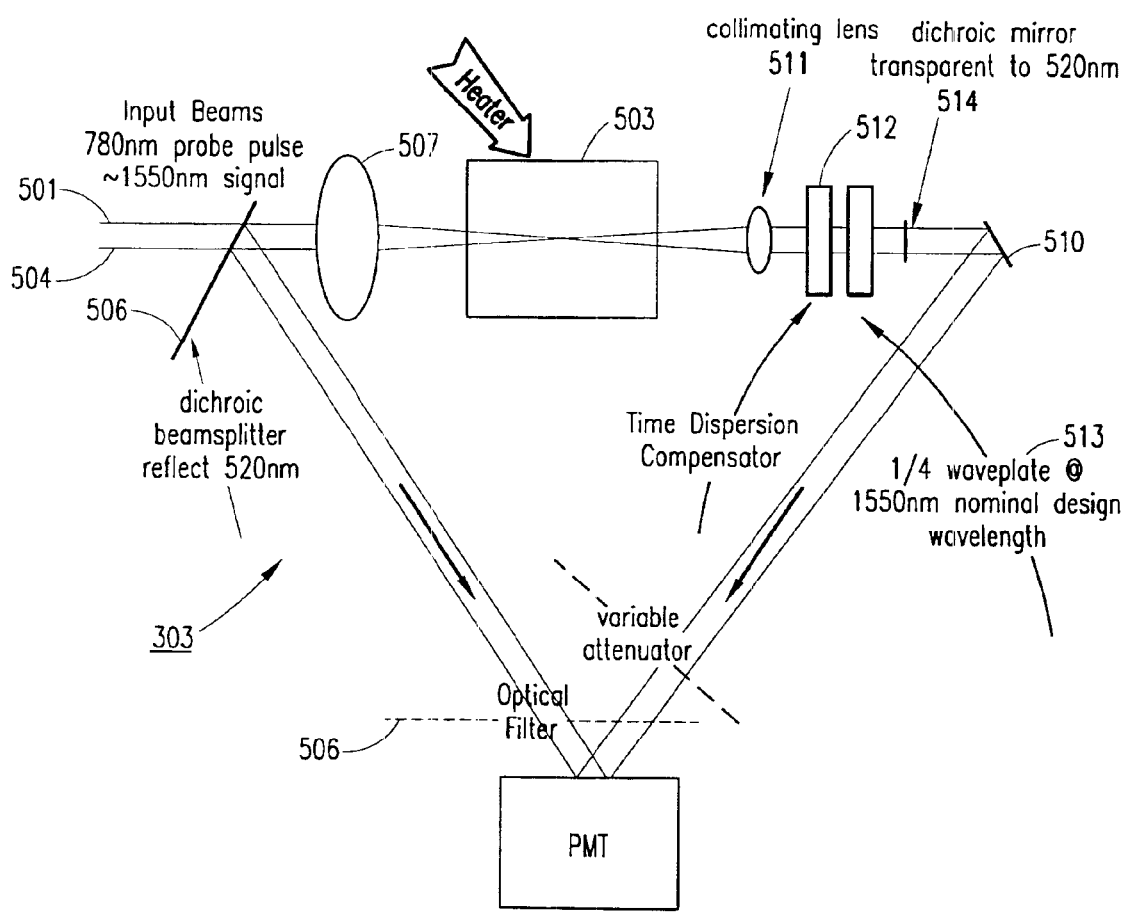
FIG. 5 illustrates another embodiment of the invention using a dual-pass polarization independent approach.

FIG. 5 illustrates another embodiment of the present invention using a dual pass or a double pass polarization-independent approach. A single nonlinear conversion element, which preferably is also a PPLN, is used as illustrated at 503. The user input signal 501, at 1550 nm wavelength, and the sampling (second harmonic) signal at 780 nm wavelength shown at 504 are both made to pass through a beam splitter shown at 506. The beam splitter 506 is designed to be transparent to both the user input signal of 1550 nm and the second harmonic signal at 780 nm. The two signals are made to pass through an optional lens 507 which would serve to bring the two signals to a focus on the nonlinear conversion crystal 503 that preferably is a PPLN of suitable geometry. The nonlinear crystal 503 performs a first sum frequency generation operation producing the first output signal that contains predominately a near-third harmonic together with any unconverted 1550 nm input signal component and unconverted second harmonic signal 504. The output signal from the PPLN 503 is made to pass through a collimating lens 511, and optionally through a time dispersion compensator shown at 512. The signal coming out of the time dispersion compensator 512 passes through a ¼ waveplate shown at 513. The ¼ waveplate 513 has the property of converting the user signal component to circular polarization and rotating the second harmonic component by 90°. The signal that comes out of the ¼ waveplate 513 becomes incident on dichroic mirror 514 which is transparent to the near-third harmonic of the user input signal. The near-third harmonic of the user input signal is around 520 nm in wavelength. The mirror 514 will let through only the near-third harmonic at 520 nm, but will reflect and return the unconverted user optical signal component and the second harmonic back to the ¼ waveplate 513. The user signal component is converted back to linear polarization but rotated relative to input polarization by a total of 90°. This converts one polarized component into the other, for example, 'p' to 's'. On the other hand, the second harmonic component undergoes a rotation of an additional 90°, whereby the total rotation that the second harmonic undergoes will be 180°, which produces no effect on the wave. The signals that are reflected by the dichroic mirror 514 and that pass through the ¼ waveplate 513 again become incident on the PPLN 503 in a second pass in the reverse direction, again to undergo a sum frequency generation operation.

The output of the second sum frequency generation operation at the PPLN 503 is a further signal that becomes incident through the lens 507 on the beam splitter 506. The further signal that comes out of the PPLN in the second pass contains a second component of the near-third harmonic that gets reflected by the beam splitter 506 to be measured by the photomultiplier tube 505. Optionally, the near-third harmonic signals that become incident on the photomultiplier tube 505 are made to pass through an optical filter that lets through frequencies close to the near-third harmonic range to the exclusion of frequencies that are different from the third harmonic frequencies. By the foregoing arrangement, the user input signal is subjected, using a single unsplit probe pulse signal, to a sum frequency generation operation in a first pass and a second pass, utilizing the two polarized components of the user input optical signal and a single PPLN for nonlinear conversion as shown at 503.

Optionally, the PPLN 503 can be provided with a heater unit (not shown) for heating the crystal 503 selectively in order to avoid photorefractive damage to the PPLN crystal. Alternatively, certain elements, e.g., magnesium, can be used to dope the PPLN material so as to minimize photorefractive damage.

Figure 6:
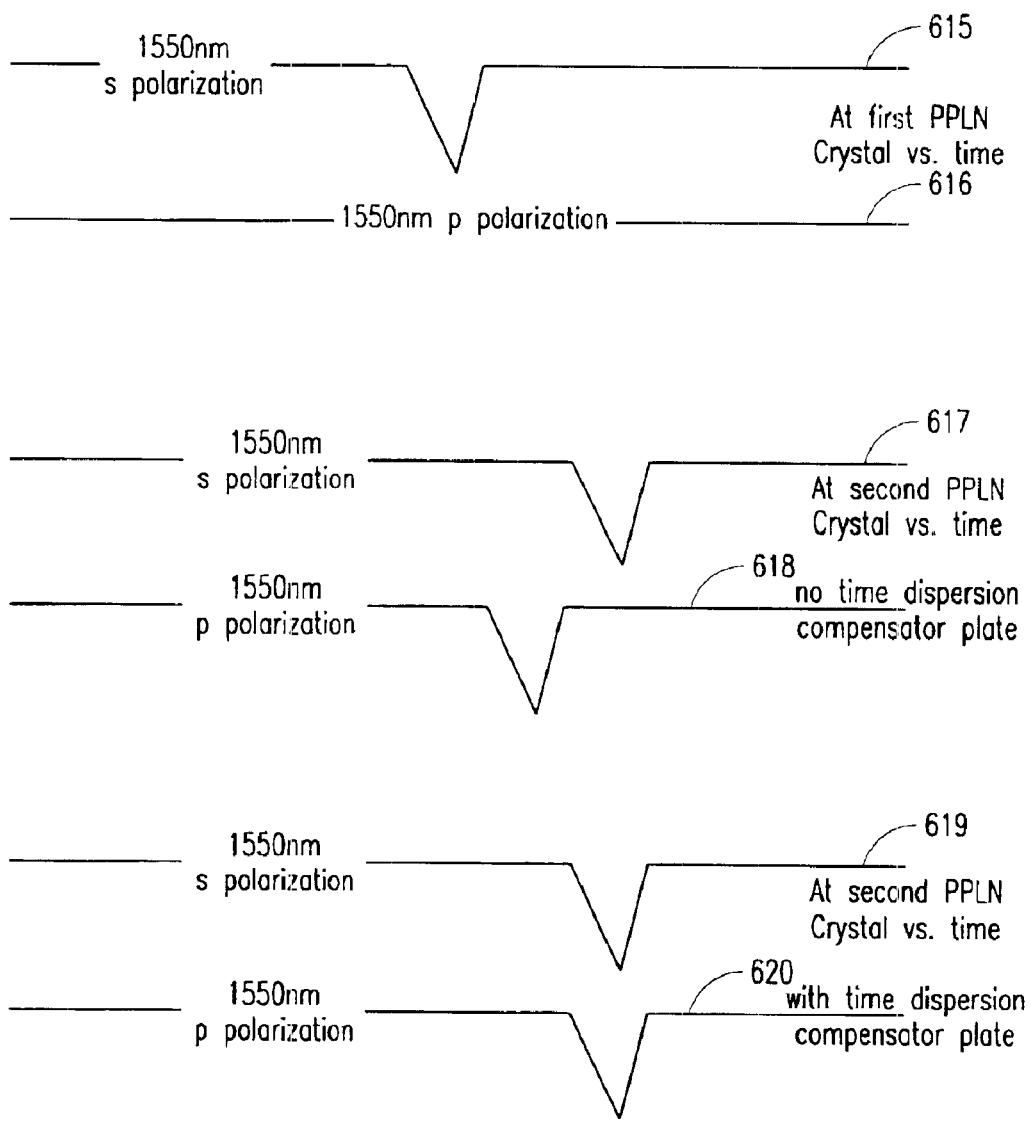
FIG. 6 illustrates the advantage of using a time dispersion compensator plate on the 'p' and 's' signals after a sum frequency generation operation.

FIG. 6 illustrates the advantage of using a time dispersion compensator plate on the two polarized signals 'p' and 's' at their near-third harmonic stage after the sum frequency generation operation. It is important to note that the 'p' and 's' components of the 1550 nm user input signal should be sampled by the second harmonic 780 nm probe signal at the same wavelength location. It is also important to note that a hole is produced in the 1550 nm 'p' polarized signal after conversion to the near-third harmonic in the first pass. The remaining 1550 nm 's' polarized signal and the second harmonic probe signal should both preferably have the same delay before they are converted in the second pass or in the second crystal, as the case may be. When this is accomplished, the 1550 nm 's' polarization and the 'p' polarization holes will be in the same location. FIG. 6 diagrammatically shows the 1550 nm 's' polarization graphs at the first PPLN crystal the first time and then the second graph shows the 1550 nm 'p' polarization. These two polarizations have been illustrated by the reference numbers 615 and 616, respectively. FIG. 6 also shows the 1550 nm 's' polarization at the second pass or at the second PPLN crystal vs. time. Also shown is the 1550 nm 'p' polarization without a time dispersion compensator plate. These two graphs are illustrated at 617 and 618, respectively. FIG. 6 further shows a situation where a time dispersion compensator plate is provided and consequently the 1550 nm 's' polarization would be coincident with the 1550 nm 'p' polarization because of the influence of the time dispersion compensator plate. Achievement of phase coincidence between 'p' and 's' polarization components is desirable and is used to advantage in both the embodiments of FIGS. 4 and 5, regardless of whether two PPLNs are used or a single PPLN is used with two passes.

EQUIVALENTS

Although preferred embodiments of the method and apparatus of the present invention have been illustrated in the accompanying drawings and described in the foregoing detailed description, it will be understood that the invention is not limited to the embodiments disclosed, but is capable of numerous rearrangements, modifications, equivalents and substitutions. For example, the probe pulse source, even though shown as 1550 nm could be 1560 nm or any other suitable wavelength, obviating the need for frequency doubling. The ¼ waveplate may be replaced by other suitable waveplate which can provide the desired phase rotation based on the initial phase relationship of the probe signal with the optical input signal. The nonlinear conversion element, and the frequency-doubler, that are preferably PPLNs, can be replaced with any other equivalent crystals that can perform the function. Nonlinear and SFG crystals may be chosen from the group comprising $LiNbO_3$, $LiTaO_3$, KTP, RTP, RTA, $G_2As$, AlGaAs, ZnS, ZnTe and SeTe, and other crystals known for the purpose in the art. The lenses used in the embodiments of FIGS. 4 and 5 could expediently be provided with antireflection or any other type of known lens-coating, to enhance the efficiency. The optical measuring unit, can be other than a photomultiplier tube or an avalanche diode. Other methods of sensing the first and second output signals or the first and second components of the output signal (near-third harmonic signals) are also conceivable. It is also within the purview of this invention to analyze the combined first and second output signals by using a microprocessor and in addition to display the output signal on a cathode ray tube. All such equivalents and substitutions are intended to be within the scope of the invention as set forth and defined in the appended claims.

What is claimed:

1. A method of polarization-independent optical sampling of an optical input signal in optical communications, comprising:

using a probe pulse source of a predetermined wavelength to obtain a probe pulse signal;

processing said optical input signal by using two polarized optical input signal components 'p' and 's' of the optical input signal with said probe pulse signal in an unsplit form, to combine said two polarized optical input signal components in first and second stages separately with said probe pulse signal, by converting in said first stage one of said two polarized input signal components to produce a first component of an output signal, and diverting said first component of said output signal into an optical measuring element;

phase shifting the other of said two polarized input signal components;

converting in said second stage said phase shifted input signal component to produce a second component of said output signal; and diverting said second component of the said output signal also into said optical measuring element.

2. A method as in claim 1 including using sum frequency generation (SFG) operation for said steps of converting said polarized input signal components in said first and second stages, and wherein said optical input signal has a known frequency range and wherein said probe pulse signal has a frequency which is approximately a second harmonic frequency of said known frequency range and wherein said output signal is a near-third harmonic signal relative to said known frequency range.

3. A method as in claim 2 wherein the step of processing includes using a dichroic splitter for polarizing the optical input signal into signal components 'p' and 's' and wherein said first stage comprises a first stage nonlinear conversion for converting 's' polarized input signal component to generate the first component of said near-third harmonic signal, and said second stage comprises a second stage nonlinear conversion for converting 'p' polarized input signal component to generate the second component of said near-third harmonic signal.

4. A method as in claim 3 wherein the step of using said SFG operation comprises using periodically poled lithium niobate (PPLN) crystals for the first and second stages of conversion.

5. A method as in claim 2 wherein said optical input signal is a signal of known fundamental frequency corresponding to a wavelength range of about 1560 nm, and wherein said near-third harmonic is nearly thrice in frequency and $1/3$ in wavelength in relation to said known frequency of the optical input signal.

6. A method as in claim 5 wherein said probe pulse signal is a converted probe pulse source frequency obtained by frequency-doubling a source which is in the range of about 1500 nm.

7. A method as in claim 6 including the step of using an optical filter after frequency-doubling, to arrest any unconverted probe pulse source frequency.

8. A method as in claim 2 including the step of using a blocking filter for preventing signal components of frequency other than the near-third harmonic from reaching said optical measuring element.

9. A method as in claim 1 wherein said optical measuring element comprises one of a photomultiplier tube and an avalanche diode.

10. A method as in claim 1 wherein the step of processing said optical input signal comprises bringing in the optical input signal for optical sampling via an optical fiber.

11. A method as in claim 1 wherein the step of diverting comprises using a dichroic splitter.

12. Apparatus for performing polarization-independent optical sampling of an optical input signal in optical communications, comprising:

a probe pulse signal source of a known wavelength from which a probe pulse signal is obtained;

an arrangement to process said optical input signal by using two polarized components 'p' and 's' of said optical input signal in first and second stages, said arrangement including;

a first stage to combine said probe pulse signal in an unsplit form with a first of said two polarized optical input signal components 'p' and 's', to generate a first component of an output signal;

a second stage to combine said probe signal in an unsplit form with a second of said two polarized optical input signal components to generate a second component of an output signal; and an optical measuring element to combine and measure a sum of the first and second components of said output signal to procure an optical sample of said optical input signal.

13. Apparatus as in claim 12 wherein said first and second stages each comprise a sum frequency generator for performing a sum frequency generation (SFG) operation and wherein said optical input signal has a known fundamental frequency range and wherein said probe pulse signal has a frequency which is approximately a second harmonic of said known frequency and wherein said output signal is a near-third harmonic frequency relative to said known frequency.

14. Apparatus as in claim 13 wherein said processing arrangement comprises first stage nonlinear converter for converting said 's' polarized input signal component to generate the first component of said near third harmonic signal, and a second stage nonlinear converter for converting said 'p' polarized input signal component to generate the second component of said near third harmonic signal.

15. Apparatus as in claim 14 wherein the sum frequency generator comprises periodically poled lithium niobate (PPLN) crystals for the first and second stage nonlinear conversion.

16. Apparatus as in claim 13 wherein said known fundamental frequency range corresponds to a wavelength of said optical input signal.

17. Apparatus as in claim 13 including a blocking filter for preventing signal components of frequency other than the near-third harmonic signal frequency from reaching said optical measuring element.

18. Apparatus as in claim 12 wherein the optical input signal is of a known fundamental frequency and said probe pulse signal is substantially a second harmonic of said known fundamental frequency, wherein said first stage converts one of said two polarized input signal components by sum frequency generation (SFG) to produce a first component of a near-third harmonic signal with a frequency nearly thrice said fundamental frequency, said apparatus including a diverter for diverting said first component of the near-third harmonic signal into said optical measuring element.

19. Apparatus as in claim 18 wherein said second stage converts the other of said two polarized input signal components by SFG to produce a second component of said near-third harmonic signal, said processing arrangement including a unit for directing the second component of the near third harmonic signal also into said optical measuring element.

20. Apparatus as in claim 12 wherein said optical measuring element comprises one of a photomultiplier tube and an avalanche diode.

21. Apparatus as in claim 12 wherein said known wavelength of the probe pulse source corresponds to a frequency of 1550 nm, the apparatus including a frequency-doubler to perform frequency-doubling of the probe pulse source.

22. Apparatus as in claim 21 wherein the user input signal has a wavelength in the range of 1560 nm, said apparatus including an optical filter located at an output of said frequency-doubler, to arrest any unconverted probe pulse source frequency.

23. Apparatus in claim 12 including a mirror for use as a diverter for directing a first component of said output signal into said optical measuring element.

24. A method of polarization-independent optical sampling of an optical input signal in optical communications, comprising:

using a probe pulse source of a predetermined wavelength range, and frequency-doubling signals from said probe pulse source in an unsplit form to obtain a converted intermediate output containing a frequency-doubled second harmonic probe pulse signal;

processing said optical input signal by using two polarized signal components 'p' and 's' of said optical input signal;

said step of processing including:

causing a sum frequency generation (SFG) operation to combine said two polarized input signal components in first and second stages separately with said frequency-doubled unsplit second harmonic probe pulse signal, converting in said first stage one of said two polarized input signal components by SFG to produce a first component of a near-third harmonic output signal, and diverting said first component of the near-third harmonic output signal into an optical measuring element;

converting in said second stage the other of said two polarized input signal components by SFG to produce a second component of a near-third harmonic signal; and directing the second component of the near-third harmonic signal also into said optical measuring element.

25. A method as in claim 24 wherein said first stage comprises:

passing said optical input signal, in a nonpolarized form, along with said second harmonic probe pulse signal through a beam splitter, and then subjecting said one polarized component of the user's optical input signal and said second harmonic probe pulse signal to sum frequency generation (SFG) in a nonlinear wavelength conversion crystal for producing a first SFG signal, said first SFG signal containing said first near-third harmonic output signal;

passing said first SFG signal containing the first near-third harmonic output signal through an achromatic ¼ waveplate that is transparent to a predetermined wavelength range including said near-third harmonic output signal, said first SFG signal also containing (i) an unconverted second harmonic probe signal which gets rotated by 90° by the ¼ waveplate, and (ii) a second polarized component of the user's optical input signal which gets rotated by 45° by the ¼ waveplate;

passing the first SFG signal through a dichroic mirror that is transparent to only said first near-third harmonic output signal, said dichroic mirror reflecting and returning at least a portion of the second harmonic probe signal and said second polarized component of the user's optical input signal in a direction of said nonlinear wavelength conversion crystal through said ¼ waveplate;

said step of diverting comprising directing said first near-third harmonic signal into said optical measuring element with the use of a mirror;

allowing said reflected returned portion of the second harmonic probe signal and the second polarized component of the user's optical input signal to pass through said achromatic ¼ waveplate in a reverse direction thereby firstly causing said second polarized component of the user's optical input signal to rotate by a total of 90° because of twice passing through said achromatic ¼ waveplate, and secondly causing said second harmonic probe signal to rotate by 180° because of twice passing through said achromatic ¼ waveplate;

subjecting said 90° shifted second polarized component of the user's optical signal and said reflected 180° rotated returned portion of the second harmonic probe signal to SFG to obtain a second near-third harmonic signal by using said nonlinear wavelength crystal; and reflecting said second near-third harmonic output signal by said beam splitter to said optical measuring element.

26. A method of nonpolarization-dependent optical sampling of an optical input signal of a known frequency in a first pass and a second pass, by using a sampling pulse that is of near second harmonic frequency relative to said known frequency, said optical input signal containing first and second polarization components, said method comprising, in said first pass, the steps of:

(a) performing sum frequency generation (SFG) of said first polarization component of the optical input signal and the sampling pulse in a nonlinear wavelength converter to obtain a first converted signal containing (i) a first near-third harmonic signal, (ii) unconverted sampling pulse and (iii) unconverted second polarization component of the optical input signal;

(b) passing said first converted signal through a ¼ waveplate that lets through said first converted signal, but rotates said unconverted second polarization component by 45° and rotates said unconverted sampling pulse by 90°; then passing said first convened signal through a dichroic mirror that is transparent to said first near-third harmonic signal, said dichroic mirror reflecting and sending back said rotated unconverted sampling pulse and rotated unconverted second polarization component of the user optical input signal towards said nonlinear wavelength converter;

(c) directing said first near-third harmonic signal to an optical measuring unit; and, in said second pass;

(d) passing reflected rotated unconverted sampling pulse and said rotated unconverted second polarization component of the user optical signal through said ¼ waveplate to shift said unconverted second polarization component of the user optical signal by an additional 45°, to make a total shift of 90° and to shift said rotated unconverted sampling pulse by an additional 90° to make a total rotation of 180°;

(e) performing SFG on said 90° shifted unconverted second polarization component of the user signal by using said reflected 180° rotated unconverted sampling pulse to obtain a second near-third harmonic signal; and (f) sending said second near-third harmonic signal to said optical measuring unit.

27. Apparatus for nonpolarization-dependent optical sampling of a user optical signal of known frequency by using a sampling pulse that is of near second harmonic frequency relative to said known frequency, comprising:

a beam splitter that is transparent to and located to let through said sampling pulse and user optical signal;

a nonlinear wave conversion element that is disposed to receive said sampling pulse and user optical signal to perform sum frequency generation (SFG) thereon to produce a first converted signal containing (i) a first near-third harmonic signal, (ii) unconverted sampling pulse and (iii) unconverted second polarization component of the user signal;

a ¼ waveplate disposed to let through said first converted signal where
  (i) the second harmonic frequency sampling pulse gets rotated by 90°;
  (ii) the unconverted second polarization component of the user signal gets rotated by 45°;
  (iii) said first near-third harmonic signal passes through unchanged;
a dichroic mirror that is transparent to said near-third harmonic and disposed in a path of said first converted signal, said dichroic mirror reflecting said second harmonic frequency sampling pulse and said unconverted second polarization component back into said ¼ waveplate, causing said second harmonic frequency sampling pulse to be rotated by an additional 90° to cause a total rotation of 180°, and causing said unconverted second polarization component of the user signal to be rotated by an additional 45° to cause a total rotation of 90°; and
an optical measuring unit disposed to receive said first near-third harmonic signal;
said nonlinear wave conversion element performing a second sum frequency generation on said reflected 180° rotated second harmonic frequency sampling pulse and said 90° rotated unconverted second polarization component of the user signal to produce a second near-third harmonic signal; said beam splitter reflecting and diverting into said optical measuring unit said second near-third harmonic signal.

28. Apparatus as in claim 27 wherein said nonlinear wave conversion element comprises a periodically poled lithium niobate (PPLN) crystal of predetermined configuration, and including a heater to apply heat to the PPLN to minimize photorefractive damage.

29. Apparatus as in claim 27 wherein said known frequency of the user optical signal corresponds ton wavelength of 1550 nm and wherein said beam splitter is a dichroic beam splitter, said apparatus including at least one collimating lens, and an optical fiber and a lens arrangement through which said user optical signal is brought in for optical sampling.

30. Apparatus as in claim 27 including an optical filter located so as to screen frequencies other than said first and second near-third harmonic signals, and let through the first and second near-third harmonic signals for measurement by the optical measuring unit.

31. Apparatus as in claim 27 including a variable attenuator in a path of the first near-third harmonic signal, and a time dispersion compensator interposed between said nonlinear wave conversion element and said ¼ waveplate.

32. An apparatus for polarization-independent optical sampling of an optical input signal in optical communications, said optical input signal having two polarized components 'p' and 's', comprising:
  a probe pulse source of a predetermined wavelength range;
  a frequency doubler for frequency-doubling signals from said probe pulse source to obtain an intermediate output containing a frequency-doubled unsplit second harmonic probe pulse signal; and
  a processing arrangement to process said optical input signal by using both polarized input signal components 'p' and 's', said processing arrangement including:
  a sum frequency generator for causing a sum frequency generation.(SFG) operation to combine each of the two polarized input signal components 'p' and 's' separately in first and second stages with said frequency-doubled unsplit second harmonic probe pulse signal.

* * * * *

UNITED STATES PATENT AND TRADEMARK OFFICE
CERTIFICATE OF CORRECTION

PATENT NO. : 6,898,000 B2
DATED : May 24, 2005
INVENTOR(S) : Jungerman et al.

Page 1 of 1

It is certified that error appears in the above-identified patent and that said Letters Patent is hereby corrected as shown below:

Column 10,
Lines 21, 24 and 51, delete "near third" and insert -- near-third --.
Line 65, after "Apparatus" insert -- as --.

Column 12,
Line 30, delete "convened" and insert -- converted --.
Line 56, insert -- a -- before "known".

Column 13,
Line 37, delete "ton" and insert -- to a --.

Column 14,
Line 32, after "generation" delete ".".

Signed and Sealed this

Fourth Day of April, 2006

JON W. DUDAS
*Director of the United States Patent and Trademark Office*